United States Patent [19]
Kane

[11] 3,796,015
[45] Mar. 12, 1974

[54] CAR POD

[76] Inventor: Daniel F. Kane, 555 Deep Woods Dr., Mundelein, Ill. 60060

[22] Filed: Oct. 26, 1972

[21] Appl. No.: 301,156

[52] U.S. Cl............................................. 52/64, 49/94
[51] Int. Cl.............................................. E04h 6/04
[58] Field of Search............. 52/66, 64, 174; 49/73, 49/94, 96, 114

[56] References Cited
UNITED STATES PATENTS

| | | | |
|---|---|---|---|
| 3,277,621 | 10/1966 | Merdich | 52/174 |
| 3,438,158 | 4/1969 | Kane | 52/64 |
| 3,600,866 | 8/1971 | Griffith | 52/64 |

Primary Examiner—John E. Murtagh
Attorney, Agent, or Firm—W. A. Snow; Charles W. Rummler

[57] ABSTRACT

An automobile shelter providing a lightweight, open-bottomed enclosure having side walls and a counterbalanced rear overhead swinging car door which is mechanically coupled to a sectioned overhead sliding driver's side door so that opening or closing the one door automatically opens or closes the other door.

4 Claims, 11 Drawing Figures

PATENTED MAR 12 1974  3,796,015

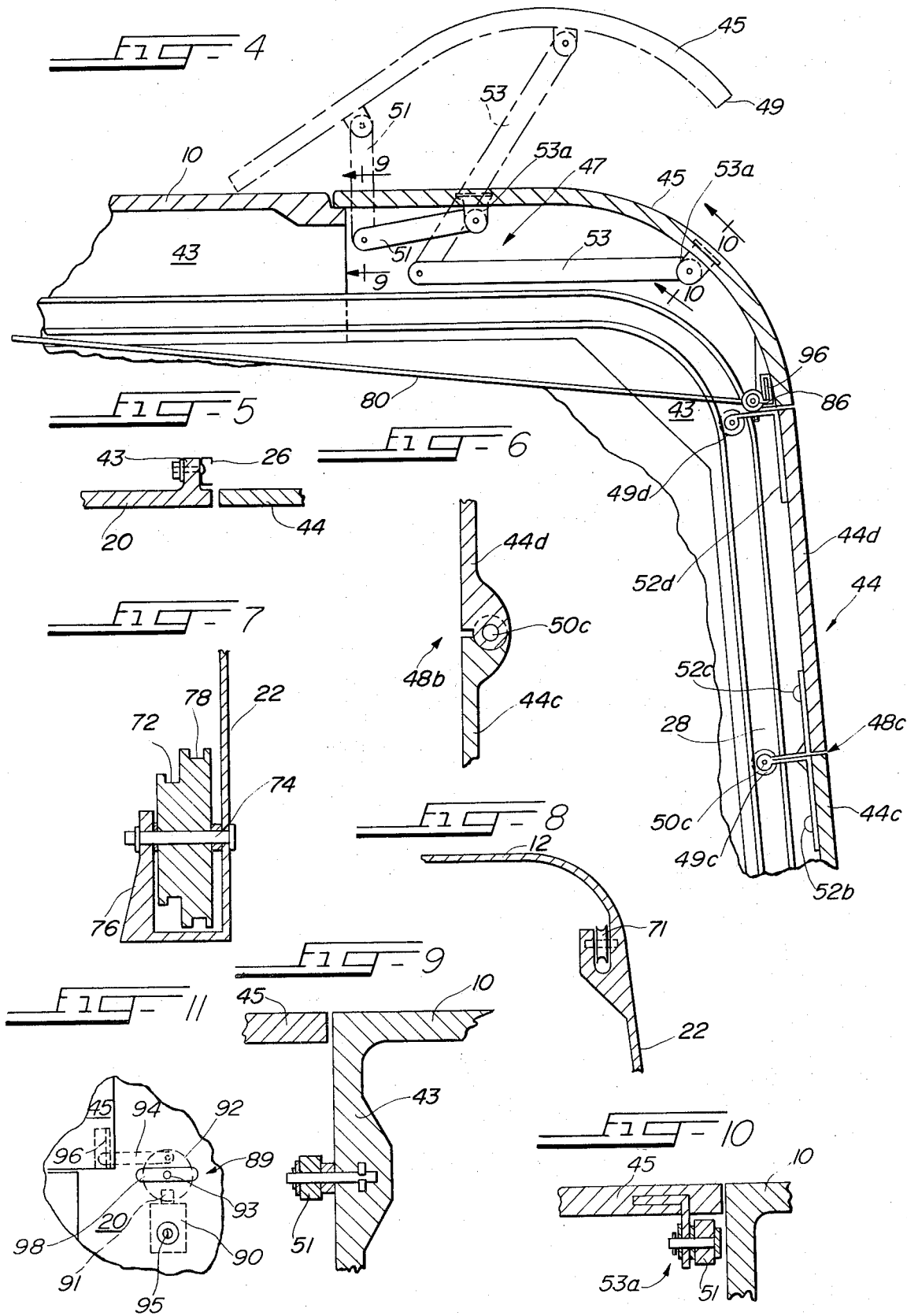

CAR POD

BACKGROUND OF THE INVENTION

This invention concerns the incorporation of a sectioned overhead sliding door into the side wall opening in a light durable molded vinyl plastic automobile shelter or car pod such as is disclosed in my U.S. Pat. No. 3,438,158, issued Apr. 15, 1969, and its mechanical coupling with the rear overhead swinging car door so that, in the interest of safety, and single-person operability, the car door cannot be open and a car driven in the pod without the side door also being open so that the driver can get out.

The disadvantages of the double-hinged side door as disclosed in my above patent and applied to the disclosed automobile shelter for outdoor use are well-known to the owners of garages having swinging overhead car doors. For one thing, the swinging door takes up a lot of side room in its opening and then in wet or snowy weather, swinging overhead doors tend to leak badly and become loaded with snow, making them difficult to operate.

There is thus an established need for a sectional overhead sliding side door installation in a car pod which mechanically couples the opening of the pod car door with the side door of an automobile so that as a single person opens the pod car door, the side door of the pod is simultaneously opened and the driver may exit from or enter the automobile.

SUMMARY OF THE INVENTION

The present invention concerns a portable and transportable automobile shelter or car pod which is characterized by its lightweight construction which incorporates a sectioned, overhead, sliding side door and a counterbalanced rear overhead swinging door which are mechanically coupled together by a sheave and cable mechanism so that both doors open and close simultaneously when each of either door is operated by a single person.

Accordingly, the primary object of this invention is to provide an improved portable car shelter into which an automobile may be driven with enclosed roof and sides and an open bottom, sectioned, overhead, sliding side door mechanically coupled to the overhead swinging car door on the rear, both of which are simultaneously open or closed when each of either door is operated.

BRIEF DESCRIPTION OF THE DRAWINGS

FIG. 4 is a sectional view taken on the lines 4—4 of FIG. 2 but showing the side door in closed position, with parts broken away;

FIG. 5 is a sectional view taken on the lines 5—5 of FIG. 1;

FIG. 6 is a sectional view taken on the lines 6—6 of FIG. 2;

FIG. 7 is a sectional view taken on the lines 7—7 of FIG. 3;

FIG. 8 is a sectional view taken on the lines 8—8 of FIG. 3;

FIG. 9 is a sectional view taken on the lines 9—9 of FIG. 4;

FIG. 10 is a sectional view taken on the lines 10—10 of FIG. 4; and

FIG. 11 is a fragmental view of the side door lock handle and pivot plate.

DETAILED DESCRIPTION OF THE DRAWINGS

Figure 1:
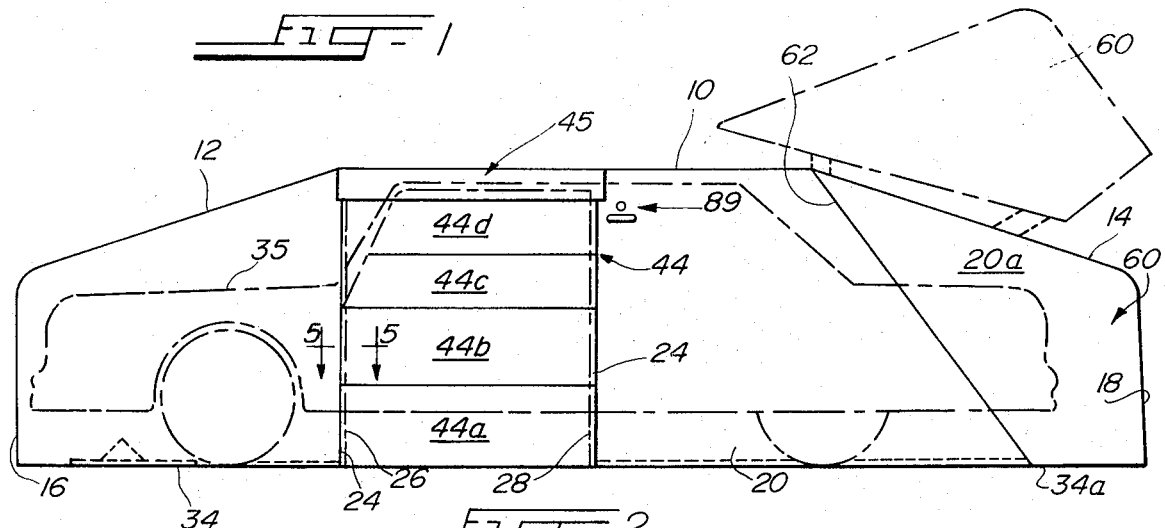
FIG. 1 is a side view of the car shelter showing the outline of a car therein and with the side and rear door in open position shown in phantom lines.
Figure 2:
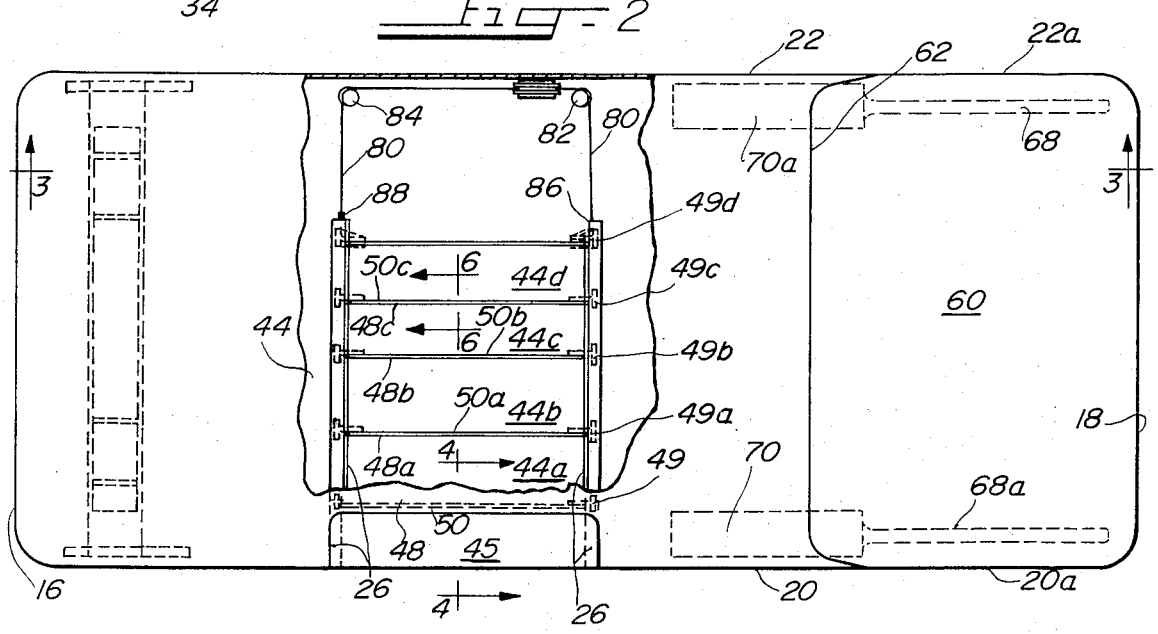
FIG. 2 is a top view of the car shelter of this invention, with parts broken away, to show the side door in open position.

Referring to the drawings, particularly FIG. 1, the car shelter or pod of this invention comprises a roof section 10, sloping front and rear roof sections 12 and 14 integral with section 10, terminating in integrally formed end sections 16 and 18, and the two sloping side sections 20 and 22, all formed of thin-walled, rigid vinyl plastic composition or built up from a formed wire mesh and covered with vinyl ferro cement. The side wall 20 has a side door opening 24 with a pair of spaced guide rails 26 and 28 attached therealong and to the inside of the roof section 10, as shown in FIGS. 1 and 2. The juncture of the ends and sides 16, 18, 20 and 22 with the roof sections 12 and 14 and with each other is a continuous curve. The shelter or pod is open at the bottom. A bottom flanged edge 34 may be planar or contain an inwardly projecting perforated flange therearound, not shown, for anchoring the pod to the ground, if desired. A car 35 is shown in dotted lines in FIG. 1.

A side door 44 which fits within the side opening 24 comprises a plurality of horizontally hinged sections 44a, 44b, 44c and 44d which are attached one to the other along the hinged junctures 48, 48a, 48b and 48c by means of elongated flush-type hinges 50, 50a, 50b and 50 c which are formed integrally with adjacent side door sections 44a, 44b, 44c and 44d. (See FIG. 6.)

Referring to FIG. 4, it is seen that brackets 52b and 52c mount the hinge 50c adjacent to and on the inside of the juncture 48c to the top and bottom of door sections 44c and 44d, respectively. Guide rail rollers 49c are rotatably fitted to the opposite lateral ends of the hinge 50c on the opposite ends of the hinge pin therethrough adjacent to the opposite side edges of door 44, as shown in FIGS. 2 and 4. Guide rollers 49, 49a and 49b, now shown, are similarly mounted to the opposite ends of the hinge pins through hinges 50, 50a and 50b. Hinges 50, 50a, 50b and 50c are similarly mounted to door sections 44a, 44b, 44c and 44d. Brackets 52d mounted to the top of door 44 mount guide rollers 49d adjacent to and on the inside of the door top of door section 44d. Rollers 49, 49a, 49b, 49 c and 49d engage the guide rails 24 and 28 for the opening and closing of the door sections 44a, 44b, 44c and 44d in the side opening 24 for rolling up and down thereon. Bulkhead members 43 extending inwardly from and integral with top and side sections 10 and 20 adjacent to the side opening 24 support guide rail 26 on the forward side of door opening 24, as shown in FIG. 5. Guide rail 28 is similarly supported on the rearward side of opening 24 on bulkhead member 43, as shown in FIG. 4. Bulkhead members 43 extend across the roof 10 and down the side 20 in continuous attachment thereto on the inside thereof for strengthening.

A top inwardly curved flap section 45 fits within the top of the side opening 24 above the top section 44d of door 44, as shown in FIGS. 1, 2 and 4, for the complete closure of the top of the opening 24 at the juncture of the roof 12 and the top of the door 44 in the closed position. (See full line section in FIG. 4.)

A four-bar linkage 47 comprises link members 51 and 53, as shown in FIG. 4. Each link member is pivotally mounted at one end to a bulkhead member 43 in a manner such as shown in FIG. 9, and at the other end to the bracket 53a on the inward side of curved flap section 45, as shown in FIG. 10, for the uplifting and swinging back of one end of top curved section 45 to provide clearance for the sliding of door 44 as it is opened on guide rails 24 and 28 which are mounted to the under side of roof section 10. A similar four-bar linkage (not shown) is pivotally mounted in like manner to the opposite side for the same purpose.

A rear door 60, which is formed with the roof section 14, the end section 18 and the side walls 20a and 22a as integral parts thereof, joins to the main body of the shelter at the diagonal juncture line 62 which is directed rearward and downward from the roof line, as shown in FIG. 1.

A four-bar linkage 64 comprises short upper and a long lower link members 66 and 68. One end of 68 is pivotally secured to the lowermost rear corner of the rear door, on side wall 22a, as at 68a, while the other end is pivotally secured to the side wall 22 at 68b. One end of short link arm 66 is pivotally secured to the inner surface of wall 22a as at 66a and to the inner upper surface of side wall 22a as at 66b. (See FIG. 3.) A similar four-bar linkage is pivotally mounted in like manner to the inner side of side member 20 at the other side of the door 60 for the cooperative uplifting and opening of the forward and rearward ends of the rear door 60. Counterweight members 70 and 70a are fixedly mounted to the pivoted ends of link members 68 and 68a so as to counterbalance the weight of the rear door 60 in the open and shut position. An open rear door 60 counterbalances the counterweights 70 and 70a in the lowered position. A closed rear door 60 counterbalances the counterweights 70 and 70a in the raised position. The bottom edge 34a of the door 60 lies in the same plane as the bottom edge 34 of the side panels when in the closed position and is raised high enough to allow clearance of the car in the open position.

Figure 3:
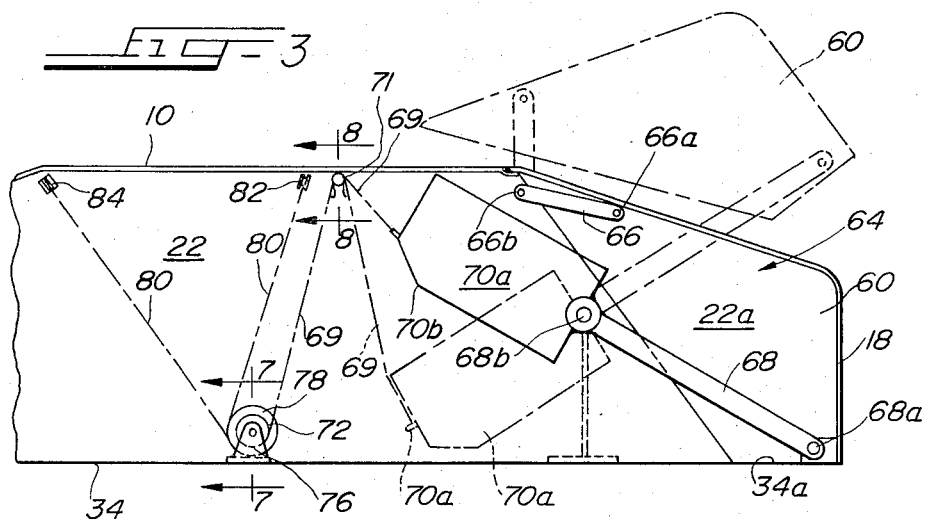
FIG. 3 is a sectional view taken on the lines 3—3 of FIG. 2.

A cable 69 is affixed by means of a bolt 70b to one end of counterweight 70a and passes diagonally upward through the aft pulley 71 mounted on the inside of the side panel 22, as shown in FIGS. 3 and 8, and diagonally downward to wind around and tie to a small cable drum 72 in a counterclockwise direction, as shown in FIGS. 3 and 7. A shaft 74 extending from the side wall 22 rotatably mounts the drum 72. A bracket member 76 affixed to the side wall 22 adjacent the bottom edge 34 rotatably mounts one end of the shaft 74. The shaft 74 is rotatably mounted in side wall 22.

A large cable drum 78 is fixedly and coaxially mounted to the outer side of drum 72, as shown in FIG. 7. Cable 80 passes diagonally upward after being tied and wrapped around the drum 78 in a clockwise direction, as shown in FIG. 3. A rearward pulley 82 is rotatably anchored to the inside of the juncture of the roof 10 and to the side panel 22 generally in line with the opposite side of the opening 24 adjacent to the bulkhead 43a, as shown in FIGS. 2 and 3. Cable 80 passes diagonally upward through the pulley 82 and along the under side of the roof 10 to a fastener 86, as shown in FIG. 4. Fastener 86 is mounted to the top of door section 44d, as shown in FIG. 4, adjacent to the rearward side of opening 24.

A forward pulley 84 is likewise rotatably anchored to the inside of the juncture of the roof 10 and the side panel 22 generally in line with the forward side of the opening 24. Cable 80 passes diagonally upward from pulley 78 through the pulley 84 and along the under side of the roof 10 to a fastener 88, as shown in FIGS. 2 and 4.

In operation, the sectioned door 44 is lifted to open. The top edge of side section 44d of door 44 bears on the under side of the outer edge 49 of the inwardly curved section 45 so that the lifting of the side section 44d lifts the curved section 45. Section 45 moves up and out of the way as it is so lifted, permitting the sectioned door 44 to slide in underneath the roof 10 on door roller guide tracks 26 and 28.

As door 44 is lifted, cables 80 relax over pulleys 82 and 84 and wind up clockwise on the larger cable drum 78 under the rotating action of cable 69 which is wound counterclockwise on the smaller cable drum 72. Cable 69 is thereby relaxed over pulley 71 which removes the upward pull on the counterweight 70a and allows it to move downward, which in so doing opens the rear door 60.

A standard overhead door lock 89 is mounted on the side wall 20 adjacent to the side of the door opening 24 and next to the leg member 43a, as shown in FIG. 1, for engagement with a slotted member 96 which is mounted on the inside of the top inwardly curved section 45, as shown in FIGS. 1 and 11. A slide bar 94 which is mounted on the inside of side 20 engages the slotted member 96 at one end, as shown in FIG. 11. A plate 92 which is pivotally mounted on the inside of side 20 to a shaft 93 is operatively connected to the other end of the slide bar 94. The shaft 93 rotatably extends through the side wall 20. Detent 91 in lock 90 engages a keeper in rotary member 92, which detent moves in and out by a key inserted in key slot 95. A handle 98 is mounted to the extending end of shaft 93 to operate the lock 89.

Although but one specific embodiment of this invention has been herein shown and described, it will be understood that details of the construction shown may be altered or omitted without departing from the spirit of the invention as defined by the following claims.

I claim:

1. An enclosure for a vehicle comprising:
   a. opposed, spaced upright side walls with bottom flanged edges and having a side door opening and a rear door opening,
   b. a roof section connected to the side walls,
   c. a rear door for closing the rear door opening, said rear door comprising side sections and an end wall and roof section, said side sections of said rear door and said spaced side walls of the enclosure pivotally connected by four-bar linkage means and counterbalanced by counterweights mounted thereto,
   d. a side door for closing the side door opening, and
   e. a pulley, drum and cable means mechanically coupling the opening and closing of the side door with that of the rear door whereby the rear door opens and closes simultaneously with the side door, and vice versa.--

2. An enclosure as set forth in claim 1 wherein the side door comprises:
   a. a plurality of horizontal sections hingedly connected together and having hinge pins,
   b. opposed, spaced guide rails mounted to the inner surface of said side wall adjacent the side door opening and extending across on the under side of the roof,
   c. roller means mounted coaxially with the hinge pins and at the ends thereof on the sectioned door for rolling on said guide rails, and
   d. a flap means for closure of the juncture between the roof and the top of the door upon closure of the side door and providing for sliding clearance thereof when open.

3. A vehicle enclosure as set forth in claim 1 wherein the four-bar linkage means comprises:
   a. a short upper link member, and
   b. a long lower link member.

4. A vehicle enclosure as set forth in claim 1 wherein the pulley, drum and cable means comprises:
   a. a large cable drum rotatably mounted adjacent to and extending from the inside of the side wall adjacent to the bottom edge of the enclosure,
   b. a small cable drum coaxially and fixedly mounted to the large cable drum,
   c. a forward pulley mounted to the juncture of the roof and the side wall opposite the door opening in line with the forward guide rail and the large cable drum,
   d. a rearward pulley mounted to the juncture of the roof and the side wall opposite the door opening in line with the rearward guide rail and the large cable drum,
   e. a pair of cables each wound clockwise around the large drum one of which passes through the forward pulley and attaches to the forward end of the top edge of the side door, the other of which passes through the rearward pulley and attaches to the rearward end of the top edge of the side door,
   f. an aft pulley mounted to the roof adjacent to the side wall opposite the side door opening and in line with the small cable drum and the counterweight adjacent to the side opposite the side door opening, and
   g. a cable wound counterclockwise around the small drum which passes through the aft pulley and attaches to the counterweight on the side opposite the side door opening.

* * * * *